United States Patent
Runcie et al.

(10) Patent No.: US 8,819,113 B2
(45) Date of Patent: Aug. 26, 2014

(54) REMOTE PROVISIONING OF VIRTUAL MACHINES

(75) Inventors: George Runcie, Santa Barbara, CA (US); Derek Rodrigues, Ojai, CA (US)

(73) Assignee: Kaseya International Limited NJ (US)

( * ) Notice: Subject to any disclaimer, the term of this patent is extended or adjusted under 35 U.S.C. 154(b) by 634 days.

(21) Appl. No.: 12/395,943

(22) Filed: Mar. 2, 2009

(65) Prior Publication Data

US 2010/0223368 A1 Sep. 2, 2010

(51) Int. Cl.
*G06F 15/16* (2006.01)

(52) U.S. Cl.
USPC ........... 709/203; 709/213; 709/217; 709/218; 709/220

(58) Field of Classification Search
CPC .................................................. H04L 41/0806
USPC ......... 709/220–223, 203, 213, 214, 216, 217; 718/1, 100, 104; 713/1, 2; 717/167
See application file for complete search history.

(56) References Cited

U.S. PATENT DOCUMENTS

| | | | | |
|---|---|---|---|---|
| 7,577,722 | B1 * | 8/2009 | Khandekar et al. | 709/220 |
| 7,801,994 | B2 * | 9/2010 | Kudo | 709/226 |
| 8,176,153 | B2 * | 5/2012 | Bose | 709/222 |
| 8,255,484 | B2 * | 8/2012 | Khandekar et al. | 709/217 |
| 8,387,045 | B2 * | 2/2013 | Yasutaka et al. | 718/1 |
| 8,473,594 | B2 * | 6/2013 | Astete et al. | 709/223 |
| 8,473,627 | B2 * | 6/2013 | Astete et al. | 709/229 |
| 8,635,351 | B2 * | 1/2014 | Astete et al. | 709/229 |
| 8,683,464 | B2 * | 3/2014 | Rozee et al. | 718/1 |
| 2006/0089995 | A1 * | 4/2006 | Kerr et al. | 709/227 |
| 2008/0201414 | A1 * | 8/2008 | Amir Husain et al. | 709/203 |
| 2008/0209016 | A1 * | 8/2008 | Karve et al. | 709/221 |
| 2009/0144393 | A1 * | 6/2009 | Kudo | 709/218 |
| 2009/0276228 | A1 * | 11/2009 | Isaacson | 705/1 |
| 2009/0276771 | A1 * | 11/2009 | Nickolov et al. | 717/177 |
| 2009/0282404 | A1 * | 11/2009 | Khandekar et al. | 718/1 |
| 2009/0300619 | A1 * | 12/2009 | Hicks et al. | 718/100 |
| 2009/0327471 | A1 * | 12/2009 | Astete et al. | 709/223 |
| 2010/0057833 | A1 * | 3/2010 | DeHaan | 709/203 |
| 2010/0057913 | A1 * | 3/2010 | DeHaan | 709/226 |
| 2010/0058328 | A1 * | 3/2010 | DeHaan | 717/176 |
| 2010/0058332 | A1 * | 3/2010 | DeHaan | 717/177 |
| 2010/0095000 | A1 * | 4/2010 | Kettler et al. | 709/226 |
| 2010/0217843 | A1 * | 8/2010 | DeHaan et al. | 709/221 |
| 2010/0217848 | A1 * | 8/2010 | DeHaan et al. | 709/222 |
| 2010/0217944 | A1 * | 8/2010 | DeHaan et al. | 711/156 |
| 2010/0223368 | A1 * | 9/2010 | Runcie et al. | 709/222 |
| 2010/0299478 | A1 * | 11/2010 | Runcie et al. | 711/112 |
| 2013/0227570 | A1 * | 8/2013 | Runcie et al. | 718/1 |

OTHER PUBLICATIONS

Distributed Management Task Force, Inc.; "Open Virtualization Format Specification"; Feb. 22, 2009; Version 1.0.0.*
VMware, Inc et al.; "The Open Virtual Machine Format Whitepaper for OVF Specification"; 2007.*

* cited by examiner

*Primary Examiner* — Jimmy H Tran

(57) ABSTRACT

In a virtual machine environment, virtual machines may be remotely provisioned on a virtual machine host. A server application on a machine remote from a network of the virtual machine host may receive provisioning parameters for a new virtual machine through a server application such as a web application. A client application is provided within the network of the virtual machine host which receives the provisioning parameters and triggers the provisioning of the new virtual machine on the virtual machine host.

20 Claims, 4 Drawing Sheets

REMOTE PROVISIONING OF VIRTUAL MACHINES

FIELD OF THE INVENTION

This invention relates to virtual machines and to the provisioning of new virtual machines on a virtual network host.

BACKGROUND OF THE INVENTION

Virtual machines are configured on virtual machine hosts, of which Microsoft Virtual Server, VMWare Server, VMWare ESX Server, are commercially available examples. Typically, the virtual machine host is protected by a firewall which prevents external communications from remote machines outside of the virtual network. It is therefore difficult to remotely provision new virtual machines from outside of a virtual machine network.

What is required is a system, method and computer readable medium for remotely provisioning virtual machines on a virtual machine host platform from a vendor independent configuration.

SUMMARY OF THE INVENTION

In one aspect of the disclosure, there is provided a method for remotely provisioning a virtual machine. The method comprises providing a client application in a network comprising a virtual network host, providing a server application in a machine remote from the network, receiving one or more provisioning parameters from a user through the server application, communicating the one or more provisioning parameters from the sever application to the client application, communicating the one or more provisioning parameters from the client application to the virtual network host, and provisioning a virtual machine on the virtual network host from the one or more provisioning parameters.

In one aspect of the disclosure, there is provided a system for provisioning virtual machines on a virtual machine host within a network. The system comprises a server application configured to receive one or more provisioning parameters of a virtual machine, and a client application configured to receive the one or more provisioning parameters from the server application and to provision a virtual machine on the virtual machine host.

In one aspect of the disclosure there is provided a computer-readable medium comprising computer-executable instructions for execution by a processor, that, when executed, cause a first processor to provide an interface on a remote machine to receive one or more virtual machine provisioning parameters in a host independent format, receive one or more virtual machine provisioning parameters through the interface, and communicate the one or more virtual machine provisioning parameters in a host independent format to a client application within a network.

BRIEF DESCRIPTION OF THE DRAWINGS

Reference will now be made, by way of example only, to specific embodiments and to the accompanying drawings in which.

DETAILED DESCRIPTION OF THE INVENTION

Figure 1:
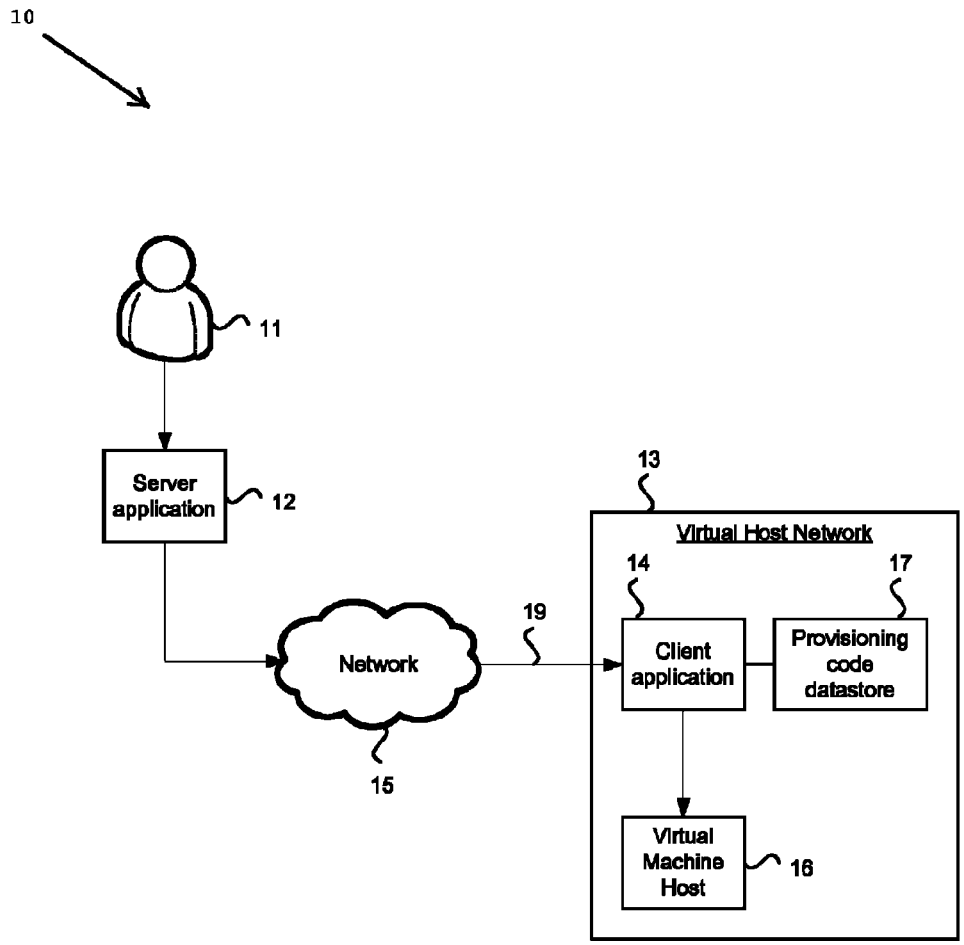
FIG. 1 illustrates a system for remotely provisioning a virtual machine.

In FIG. 1, there is shown a system 10 in accordance with an embodiment of the disclosure. In the system 10, a virtual network 13 includes a virtual machine host 16 such as a vendor specific virtual machine server, of which Microsoft Virtual Server, VMWare Server, VMWare ESX Server, are commercially available examples. A server application 12 is provided on a machine external to a network 15. The server application may be provided as a web application with a suitable interface allowing the user 11 to enter virtual machine provisioning parameters. A web application may be provided from a web server (not shown) within the virtual network 13. Provisioning parameters may include drives, memory, guest operating system, etc. These provisioning parameters may be provided independent of any virtual machine host vendor. In one embodiment, the virtual machine provisioning parameters may be entered via a web based form, though a person skilled in the art will readily recognize other ways in which these parameters may be entered. Example parameters that may be specified through the web based form include the number of CPU the virtual machine will have, amount of memory, network drivers, SCSI IDE drives, etc., though a person skilled in the art will readily understand a full range of provisioning parameters may be specified, including some vendor specific parameters where required.

The virtual machine host 16 is typically provided with a firewall which prevents direct communication with the virtual machine host from outside of the network 13. In accordance with an embodiment of the disclosure, the virtual network 13 includes a client application 14 which provides a communication channel 19 between the server application 12 via the outside network 15 on one end and between the virtual machine host 16 on the other end.

Figure 2:
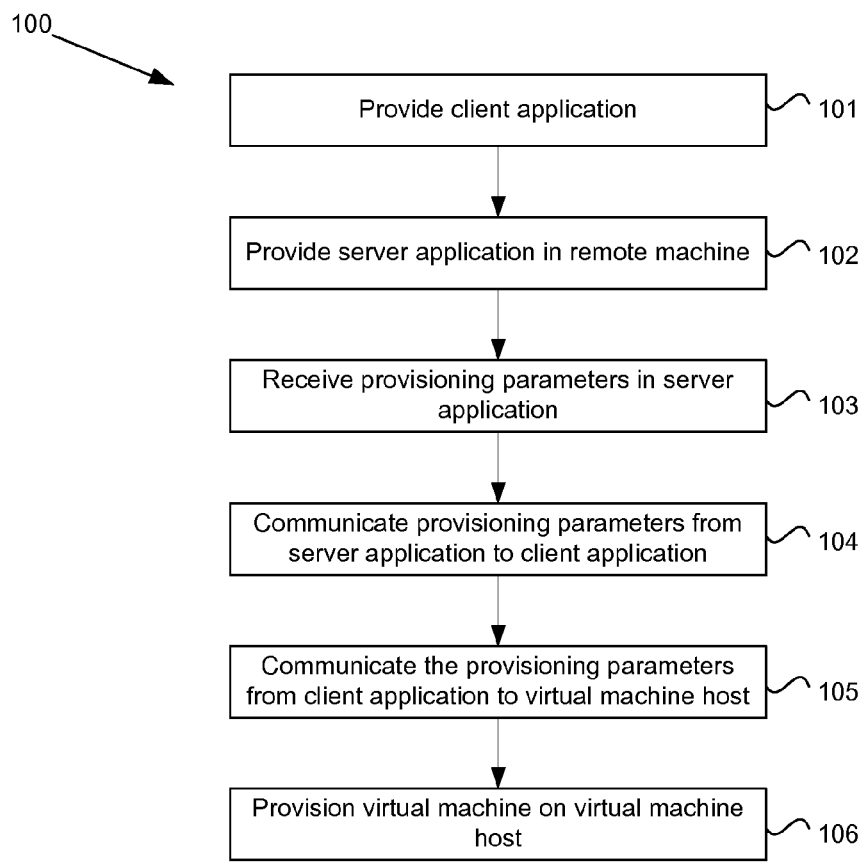
FIG. 2 illustrates a method for remotely provisioning a virtual machine.

A method for provisioning a virtual machine on the virtual machine host 16 is illustrated in the flowchart 100 of FIG. 2. Once the client application 14 and server application 12 have been provided at steps 101, 102 respectively, a user 11 may provide one or more virtual machine provisioning parameters. These provisioning parameters are received by the server application 12 (step 103) and communicated to the client application 14 through the network 15 (step 104). The client application 14 communicates the provisioning parameters to the virtual machine host 16 (step 105) which then provisions the new virtual machine in accordance with the provisioning parameters (step 106). Provisioning may be performed by the client application running in the host. There are several steps the client may take to complete the provisioning, depending on the parameters passed. For example, the provisioning parameters may include the number of CPU only, so the client running on the host may only create a virtual machine with the specified number of CPU and using default values for the other virtual machine configuration parameters.

The client application may reside on any machine within the virtual network 13 including the virtual machine host 16 itself. However, the client application 14 is configured with a communication channel that allows it to communicate with outside machines through any network firewalls.

The virtual machine configuration parameters are specified independent of the virtual machine vendor. Therefore, the user provisioning the virtual machine need not be aware of the virtual machine platform vendor. The virtual machine configuration details are transported in a vendor independent format over the network and are only instantiated into a vendor specific definition at the point of direct interaction with the virtual machine host 16. The client application performs all the marshalling required to translate the configuration parameters specified by the user into vendor specific parameters. Typically, there is a great deal of commonality among different virtualization vendors. In one embodiment, the client application 14 includes an associated data store 17 of provisioning code which stores code blocks for provisioning different parameters of virtual machines for the variety of available virtual machine host vendors. Once a vendor machine host is specified or selected, the client application selects the appropriate code blocks for configuring the specified parameters. The code blocks are combined into a vendor specific instruction set that executes within the host to perform the provisioning.

In a network having multiple virtual machine hosts 16, the machine provisioning parameters may include a specification of which virtual machine host the new virtual machine is to be provisioned on.

Figure 3:
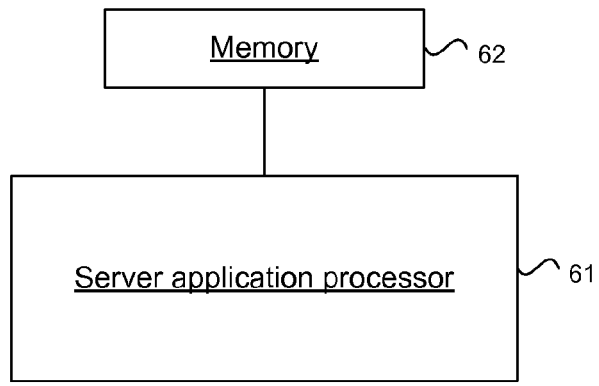
FIG. 3 illustrates a processor and memory of remote machine that executes a server application.
Figure 4:
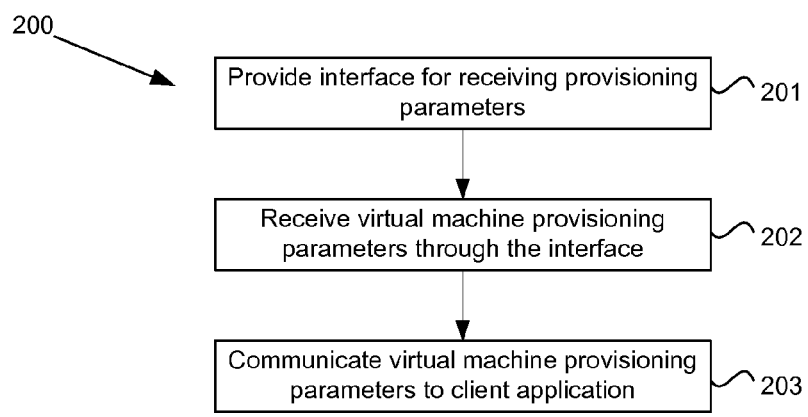
FIG. 4 illustrates an instruction set that may be executed on the processor and memory of FIG. 3.

The components of the systems 10 may be embodied in hardware, software, firmware or a combination of hardware, software and/or firmware. In a hardware embodiment, the server application 12 may be executed on a device, such as a computer, etc including a processor 61 operatively associated with a memory 62 as shown in FIG. 3. The memory 62 may store instructions that are executable on the processor 61. An instruction set 200 that may be executed on the processor 61 is depicted in the flowchart of FIG. 3. Specifically, when executed, the instruction set 200 allows the processor to provide the server application through an interface (step 201), which allows the user to enter virtual machine provisioning parameters. The provisioning parameters are recorded by the processor 61 (step 202) and communicated to the client application (step 203) in a host independent format.

Figure 5:
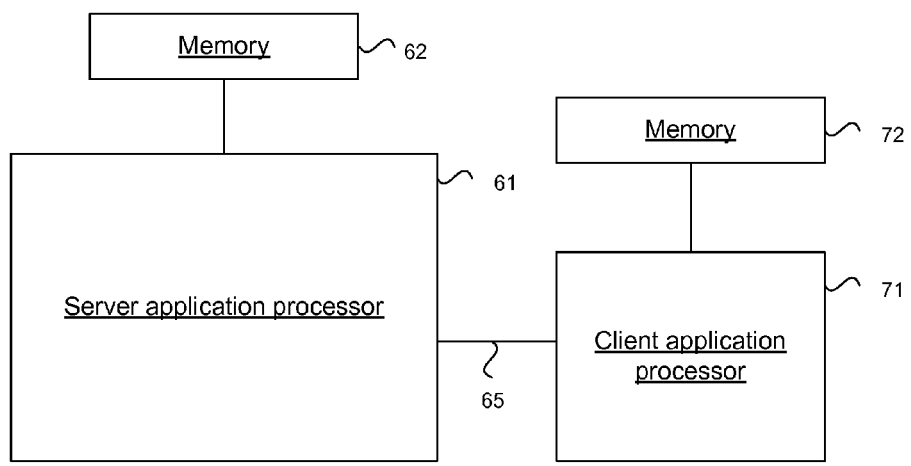
FIG. 5 illustrates the processor and memory of FIG. 3 in association with a processor and memory of a network machine that executes a client application.

As shown in FIG. 5, the processor 61 may communicate through a suitable communications link 65 with further processors, such as a processor 71 of a machine within the network 13 with associated memory 72. Through the communications link 65, the processor 61 may provide the virtual machine provisioning parameters. The processor 71 may execute the client application in order to receive the virtual machine provisioning parameters and trigger the provisioning of a new virtual machine on the virtual machine host.

Although embodiments of the present invention have been illustrated in the accompanying drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A method for remotely provisioning a virtual machine comprising:
    providing a client application in a network comprising a virtual network host, the client application providing a communication channel between a server application operating outside the network and the virtual network host operating inside the network;
    providing the server application in a machine remote from the network, the server application providing an interface for a user to enter provisioning parameters to provision the virtual machine operating on the virtual network host;
    receiving one or more provisioning parameters from the user through the server application;
    communicating the one or more provisioning parameters from the server application to the client application;
    communicating the one or more provisioning parameters from the client application to the virtual network host; and
    provisioning the virtual machine on the virtual network host from the one or more provisioning parameters provided by the user, the provisioning parameters assigning only a number of central processing units (CPU) during the provision operation to the virtual machine while other virtual machine configuration parameters assigned to the virtual machine during the provisioning operation are set to default values.

2. The method according to claim 1 comprising configuring the client application to provide a communication channel between the server application and the client application.

3. The method according to claim 1 wherein the provisioning parameters are received in a vendor independent configuration.

4. The method according to claim 3 wherein the server application communicates the provisioning parameters to the client application in the vendor independent configuration.

5. The method according to claim 4 wherein the client application instantiates the provisioning parameters into a vendor specific virtual machine definition.

6. The method according to claim 1 comprising providing the server application as a web application.

7. The method according to claim 6 wherein the server application is provided as the web application from a web server within the network.

8. A system for provisioning virtual machines on a virtual machine host within a network, the system comprising:
    a processor configured to execute a server application, the server application being configured to receive one or more provisioning parameters of a virtual machine, wherein the server application is configured to provide an interface for a user to enter provisioning parameters to provision the virtual machine operating on the virtual network; and
    another processor configured to execute a client application, the client application being configured to receive the one or more provisioning parameters from the server application and to provision the virtual machine on the virtual machine host, wherein the client application provides a communication channel between the server application operating outside the network and the virtual machine host operating inside the network, and wherein the provisioning parameters provided by the user assign only a number of central processing units (CPU) during the provision operation to the virtual machine while other virtual machine configuration parameters assigned to the virtual machine during the provisioning operation are set to default values.

9. The system according to claim 8 wherein the client application comprises a provisioning code datastore that stores a plurality of code blocks for provisioning parameters of a virtual machine for a plurality of virtual machine host vendors.

10. The system according to claim 9 wherein the plurality of code blocks each comprise vendor specific code for provisioning one or more parameters of a virtual machine on a specific virtual machine host vendor.

11. The system according to claim 8 wherein the server application executes on a machine remote from the network.

12. The system according to claim 8 wherein the client application executes on a machine within the network.

13. The system according to claim 12 wherein the client application executes on the virtual machine host.

14. The system according to claim 8 wherein the client application is configured to provide a communication channel between the server application and the virtual machine host.

15. The system according to claim 8 wherein the server application is configured to communicate the one or more provisioning parameters to the client application in a vendor independent format.

16. The system according to claim 15 comprising a plurality of virtual machine hosts, wherein the client application is configured to instantiate the one or more provisioning parameters into a vendor specific configuration dependent on a selected one of the plurality of virtual machine hosts.

17. A non-transitory computer-readable storage medium comprising computer-executable instructions for execution by a processor, that, when executed, cause the processor to:
providing a client application in a network comprising a virtual network host, the client application providing a communication channel between a server application operating outside the network and the virtual network host operating inside the network;
providing the server application in a machine remote from the network, the server application providing an interface for a user to enter provisioning parameters to provision a virtual machine operating on the virtual network host;
receiving one or more provisioning parameters from the user through the server application;
communicating the one or more provisioning parameters from the server application to the client application;
communicating the one or more provisioning parameters from the client application to the virtual network host; and
provisioning the virtual machine on the virtual network host from the one or more provisioning parameters, the provisioning parameters provided by the user assigning only a number of central processing units (CPU) during the provision operation to the virtual machine while other virtual machine configuration parameters assigned to the virtual machine during the provisioning operation are set to default values.

18. The non-transitory computer readable storage medium according to claim 17 comprising instructions executable on the processor that cause the processor to execute the client application that receives the one or more virtual machine provisioning parameters and provision the virtual machine on the virtual network host.

19. The non-transitory computer readable storage medium according to claim 18 wherein the client application is configured to:
determine a host from the one or more virtual machine provisioning parameters; and
convert the one or more virtual machine provisioning parameters into a host dependent format.

20. The non-transitory computer readable storage medium according to claim 17 wherein the interface is provided as a web interface.

* * * * *